(12) United States Patent
Kim et al.

(10) Patent No.: US 7,158,593 B2
(45) Date of Patent: Jan. 2, 2007

(54) COMBINING A CLOCK SIGNAL AND A DATA SIGNAL

(75) Inventors: Gyudong Kim, Sunnyvale, CA (US); Ook Kim, Palo Alto, CA (US); Min-Kyu Kim, Cupertino, CA (US); Bruce Kim, Los Altos, CA (US); Seung Ho Hwang, Palo Alto, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 736 days.

(21) Appl. No.: 10/099,533

(22) Filed: Mar. 15, 2002

(65) Prior Publication Data
US 2002/0181608 A1    Dec. 5, 2002

Related U.S. Application Data

(60) Provisional application No. 60/276,672, filed on Mar. 16, 2001.

(51) Int. Cl.
*H04L 7/00* (2006.01)
(52) U.S. Cl. ..................................... 375/354
(58) Field of Classification Search ................ 375/238, 375/239, 219–220, 257, 259, 377; 327/35, 327/36, 170, 175, 291, 299; 370/503, 509, 370/510, 512, 535
See application file for complete search history.

(56) References Cited

U.S. PATENT DOCUMENTS

| 4,052,558 | A | * | 10/1977 | Patterson | .................. 375/283 |
|---|---|---|---|---|---|
| 4,811,361 | A | * | 3/1989 | Bacou et al. | ................ 375/242 |
| 5,050,194 | A | * | 9/1991 | Pickering et al. | ............ 375/357 |
| 5,278,902 | A | * | 1/1994 | Nugent | ........................ 380/42 |
| 6,026,124 | A | | 2/2000 | Lee et al. | |
| 6,167,077 | A | * | 12/2000 | Ducaroir et al. | ............. 375/219 |
| 6,219,357 | B1 | * | 4/2001 | Ishikawa | ..................... 370/535 |
| 6,351,489 | B1 | * | 2/2002 | Tetzlaff | ...................... 375/238 |

FOREIGN PATENT DOCUMENTS

| WO | WO 98/14885 | 4/1998 |
|---|---|---|
| WO | WO 00/16525 | 3/2000 |

* cited by examiner

*Primary Examiner*—Khanh Tran
(74) *Attorney, Agent, or Firm*—Perkins Coie LLP

(57) ABSTRACT

A method of transmitting data in a system including at least one data channel and a separate clock channel is disclosed. The method involves combining a clock signal to be transmitted on the clock channel with a data signal to generate a combined clock and data signal. In one embodiment, the data signal has been generated from data words using an encoding scheme that shifts an energy spectrum of the data signal away from an energy spectrum of the clock signal. In another embodiment, the clock signal has a plurality of pulses each having a front edge and a back edge, and the data signal is modulated onto the clock signal by moving at least one edge (i.e. front or back or both) of the plurality of pulses, thereby to create a combined clock and data signal.

35 Claims, 8 Drawing Sheets

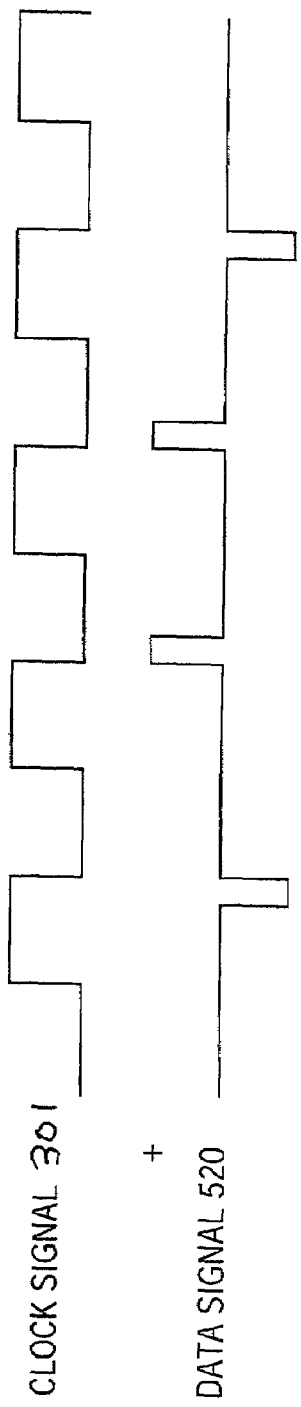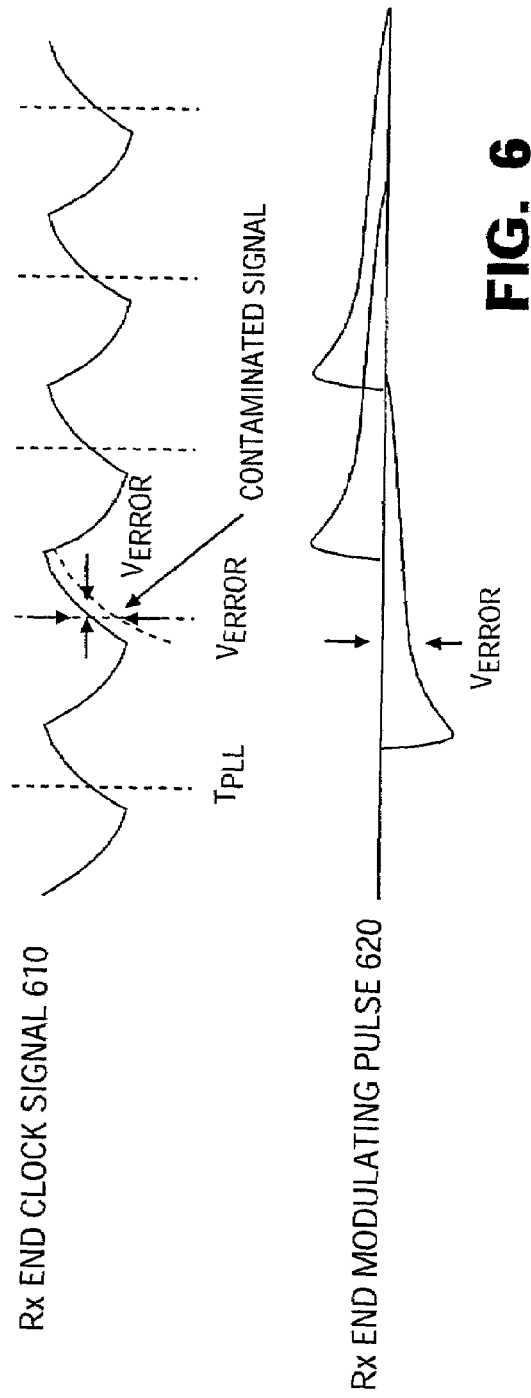

COMBINING A CLOCK SIGNAL AND A DATA SIGNAL

CROSS-REFERENCE TO RELATED APPLICATIONS

This application claims priority under 35 U.S.C. § 120 from co-pending U.S. application Ser. No. 09/393,235, filed on Sep. 9, 1999 by Gyudong Kim, Minkyu Kim, and Seung Ho Hwang, entitled "A System And Method For Sending And Receiving Data Signals Over A Clock Signal Line," which is fully incorporated into this application by reference; and this application claims priority from and the benefit of U.S. Provisional Patent Application No. 60/276,672, filed on Mar. 16, 2001, entitled "Encoding Scheme for a Phase Modulated Clock Signal," which is fully incorporated into this application by reference.

BACKGROUND OF THE INVENTION

1. Field of the Invention

The present invention relates to transmitting clock and data signals.

2. Description of the Background Art

The digital visual interface DVI 1.0 Specification, Digital Display Working Group [online], Apr. 2, 1999 [retrieved Mar. 15, 2001], retrieved from the Internet:<URL:http://www.ddwg.org>, which is fully incorporated herein by reference, attempts to address the computer industry's requirements for a digital connectivity specification for high-performance personal computers (PCs) and digital displays.

In synchronous high-speed transmission systems that process digital signals, a clock signal and one or more data signals are transmitted over separate wires. For example, the system transmits data signals over data channels, and transmits a clock signal over a clock channel. These separate channels that transmit only a data signal or only a clock signal permit high performance digital data to be transmitted using a system that has a very simple architecture.

However, because only the clock signal is transmitted over the clock channel, additional signals, such as data signals for example, cannot be transmitted over the clock channel using this system. Therefore, this system does not transmit both a data signal and the clock signal over the clock channel.

SUMMARY OF THE INVENTION

A method and an apparatus to combine a clock signal and a data signal, and to transmit the combined signal over one cable, are disclosed.

According to one aspect of the invention, provided is a method of transmitting data in a system including at least one data channel and a separate clock channel, the clock channel being used to decode data transmitted on the at least one data channel, comprising:

combining a clock signal to be transmitted on the clock channel with a data signal having a plurality of data words, to generate a combined clock and data signal, and transmitting the combined clock and data signal on the clock channel;

wherein the data signal has been generated from the data words using an encoding scheme that shifts an energy spectrum of the combined clock and data signal away from an effective loop bandwidth of a clock recovery block.

According to another aspect of the invention, the encoding scheme maps the data word from a p-bit data word into a q-bit data word, where q>p.

According to another aspect of the invention, the encoding scheme is direct current (DC) balanced to minimize a DC component of the combined signal.

According to another aspect of the invention, the clock signal has a plurality of pulses, each pulse of the plurality of pulses having a front edge and a back edge, and wherein the combining step comprises:

modulating the data signal onto the clock signal by moving the front or back edges of the plurality of pulses.

According to a further aspect of the invention, the clock signal has a plurality of pulses, each pulse of the plurality of pulses having a front edge and a back edge, and wherein the combining step comprises:

modulating the data signal onto the clock signal by moving the front edges of the plurality of pulses.

According to another aspect of the invention, the clock signal has a plurality of pulses, each pulse of the plurality of pulses having a first edge and a second edge, and wherein the combining step comprises:

modulating the data signal onto the clock signal by moving both the front edges and the back edges of the plurality of pulses.

According to a further aspect of the invention, the combining step further comprises:

performing pre-emphasis to the combined signal, so that inter-symbol interference of the combined signal transmitted over a band-limited channel is minimized or reduced.

According to another aspect of the invention, the encoding scheme further comprises:

increasing a number of transitions in each data word. The encoding scheme may also be an encryption scheme.

According to another aspect of the invention, the encoding scheme includes the step of:

encoding an instantaneous data word of said plurality of data words as function of both the instantaneous input word and earlier data words in the data signal.

Further, the encoding scheme may include the step of:

encoding one of the data words of said plurality of data words as a function of one of the following:

future data words; or earlier data words; or future and earlier data words; of said plurality of data words.

According to another aspect of the invention, provided is a method of transmitting data in a system including at least one data channel and a separate clock channel, the clock channel being used to decode data transmitted on the at least one data channel, comprising:

providing a clock signal having a plurality of pulses, each pulse of the plurality of pulses having a front edge and a back edge;

modulating a data signal having a plurality of data words onto the clock signal by moving at least one edge of the plurality of pulses, thereby to create a combined clock and data signal; and transmitting the combined clock and data signal on the clock channel.

The method may further comprise:

encoding the data words using an encoding scheme that maps the data words from p-bit data words into a q-bit data words, where q>p.

The encoding scheme may be direct current (DC) balanced to minimize a DC component of the combined signal.

According to another aspect of the invention, the modulating step comprises:
  modulating the data signal onto the clock signal by moving both of the front and back edges of the plurality of pulses.
The modulating may step comprise:
  modulating the data signal onto the clock signal by moving the front edges of the plurality of pulses.
The modulating step may comprise:
  modulating the data signal onto the clock signal by moving the back edges of the plurality of pulses.
The method may further comprise:
  performing pre-emphasis to the combined signal, so that inter-symbol interference of the combined signal transmitted over a band-limited channel is minimized or reduced.
The method may further comprise:
  encoding the data words using an encoding scheme that increasing a number of transitions in each data word, and the encoding scheme may be an encryption scheme.
  Alternatively, the encoding scheme may comprise:
  encoding an instantaneous data word of said plurality of data words as function of both the instantaneous input word and earlier data words in the data signal.
  Alternatively, the encoding scheme may comprise:
encoding one of the data words of said plurality of data words as a function of one of the following:
future data words; or earlier data words; or future and earlier data words; of said plurality of data words.
  According to yet another aspect of the invention, provided is a system for transmitting data, comprising
  a transmitter including at least one data channel and a separate clock channel, the clock channel being used by a receiver to decode data transmitted on the at least one data channel, the transmitter being operative to:
  combine a clock signal to be transmitted on the clock channel with a data signal having a plurality of data words, to generate a combined clock and data signal, and transmit the combined clock and data signal on the clock channel;
wherein the data signal has been generated from the data words using an encoding scheme that shifts an energy spectrum of the combined clock and data signal away from an effective loop bandwidth of a clock recovery block.
  In the system, the encoding scheme may map the data word from a p-bit data word into a q-bit data word, where q>p.
  According to another aspect of the invention, the clock signal has a plurality of pulses, each pulse of the plurality of pulses having a front edge and a back edge, and wherein the transmitter combines the clock signal with the data signal by:
  modulating the data signal onto the clock signal by moving at least one edge of the plurality of pulses.
  According to another aspect of the invention, the modulation may be done by moving the front edges of the plurality of pulses.
  According to another aspect of the invention, the modulation may be done by moving both the front edges and the back edges of the plurality of pulses.
  According to yet another aspect of the invention, provided is a system for transmitting data, comprising
  a transmitter including at least one data channel and a separate clock channel, the clock channel being used by a receiver to decode data transmitted on the at least one data channel, the transmitter being operative to:
  provide a clock signal having a plurality of pulses, each pulse of the plurality of pulses having a front edge and a back edge;
  modulate a data signal having a plurality of data words onto the clock signal by moving at least one edge of the plurality of pulses, thereby to create a combined clock and data signal; and
  transmit the combined clock and data signal on the clock channel.
  The transmitter may further be operative to:
  encode the data words using an encoding scheme that maps the data words from p-bit data words into a q-bit data words, where q>p.
  The transmitter may further be operative to:
  modulate the data signal onto the clock signal by moving both of the front and back edges of the plurality of pulses.
  Alternatively, the transmitter may further be operative to:
  modulate the data signal onto the clock signal by moving the front edges of the plurality of pulses.
  Alternatively, the transmitter may further be operative to:
  modulating the data signal onto the clock signal by moving the back edges of the plurality of pulses.
  According to a further aspect of the invention, the transmitter uses an encoding scheme for generating the data signal from the data words that shifts an energy spectrum of the combined clock and data signal away from an effective loop bandwidth of a clock recovery block.
  Other features and embodiments of the present invention will be illustrated by way of example and not by way of limitation in the accompanying abstract, drawings, and detailed description. The abstract, summary of the invention, drawings, and detailed description are, accordingly, to be regarded in an illustrative rather than restrictive sense and the invention measured only in terms of the claims.

BRIEF DESCRIPTION OF THE DRAWINGS

The invention is illustrated by way of example and not by way of limitation in the figures of the accompanying drawings.

FIG. 5 shows individual clock and data components of a combined clock and data signal.

FIG. 6 illustrates the effects of noise on the recovered clock and data signal at the receiving end.

DETAILED DESCRIPTION

A method and system to combine a data signal with a clock signal and to transmit the combined signal are disclosed. The combined clock and data signal are transmitted over a clock channel. This increases the amount of bandwidth that is available in the clock channel. In one embodiment, the data signal is encoded, and the encoded data signal is combined with the clock signal. The encoding of the data signal causes some of the energy components of the encoded data signal to move to higher frequencies, so that a low pass filter can attenuate them. The low pass filter can then recover the clock signal from the combined signal, and output the recovered signal to other devices.

An example of a system that combines the clock signal and the data signal is a transition-minimized differential signaling (TMDS) system, which is described in U.S. application Ser. No. 09/393,235, entitled "A System And Method For Sending And Receiving Data Signals Over A Clock Signal Line," became an U.S. Pat. No. 6,463,092 B1, which is fully incorporated into this application by reference.

Figure 1:
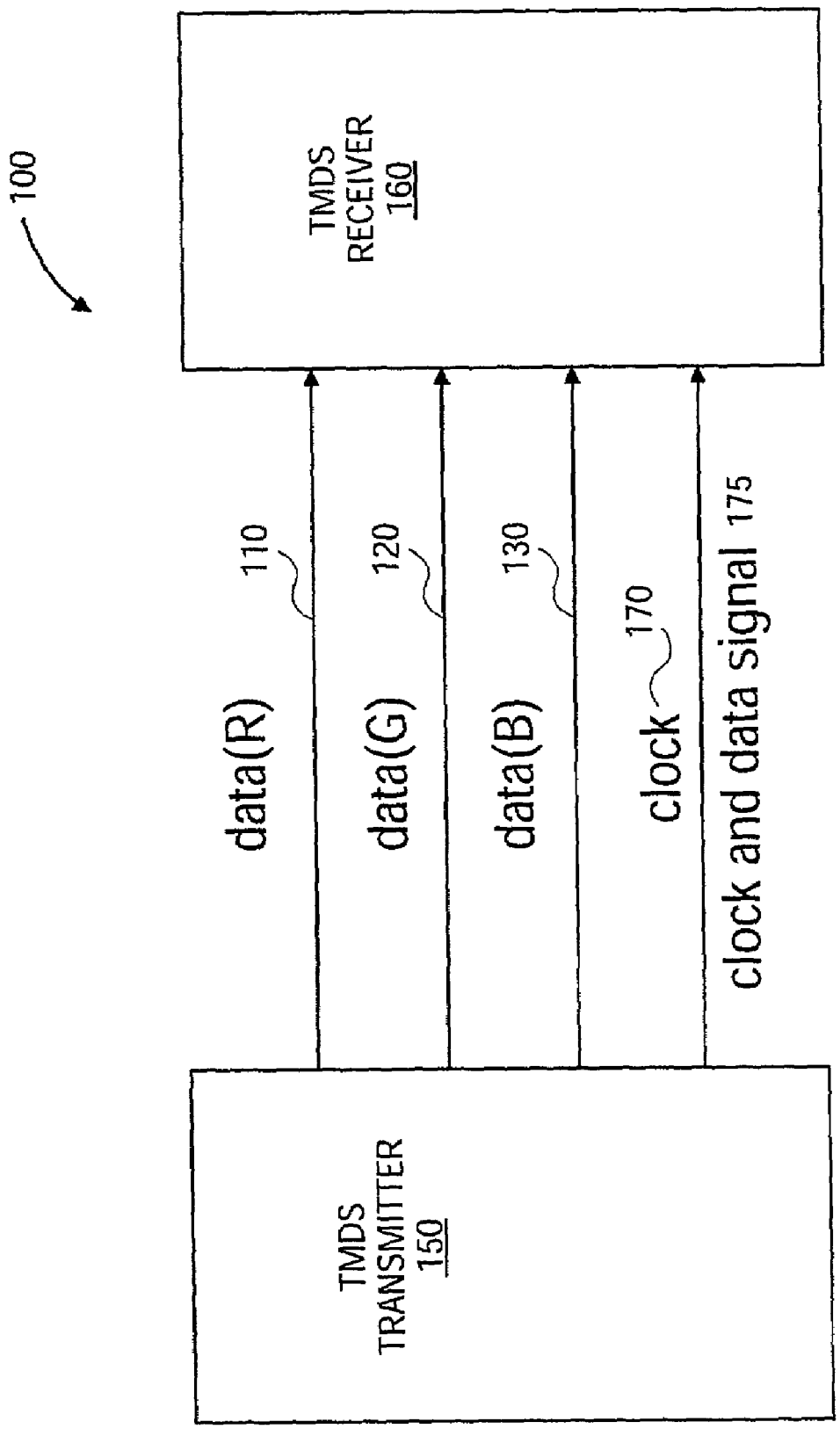
FIG. 1 is a block diagram of a transition-minimized differential signaling (TMDS) system that transmits a clock signal and one or more data signals over the clock channel.

FIG. 1 shows a block diagram of the TMDS system that can generate and transmit the combined clock and data signal. The combined signal is generated at the transmitting end 150, and the data signal and the clock signal are recovered at the receiving end 160. The combined clock and data signal 175 is transmitted over clock channel 170. Additional data signals are transmitted over data channels 110, 120, and 130.

Figure 2:
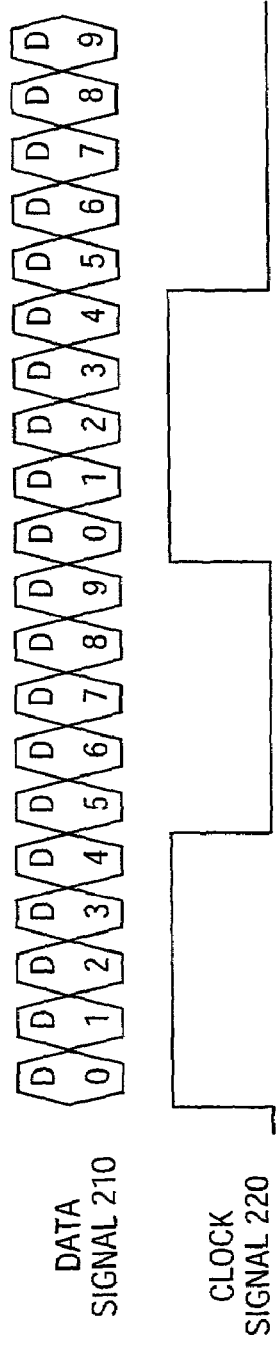
FIG. 2 is a timing diagram for data signals and clock signals that are transmitted over the clock channel.

FIG. 2 shows an example of a data signal 210 that is typically transmitted separately from a clock signal 220 over one of the data channels 110, 120, 130. The clock signal 220 is used by the TMDS receiver 160 to extract the data from the data signal 210. In addition to the data signal(s) 210 transmitted over one or more data channels 110, 120, 130, a further data signal may be combined with the clock signal 220 to generate a combined clock and data signal. The transmitting end 150 as shown in FIG. 1 may generate the combined clock and data signal by multiplexing the further digital data signal and the clock signal. The transmitting end then transmits the multiplexed signal over the clock channel.

Figure 3:
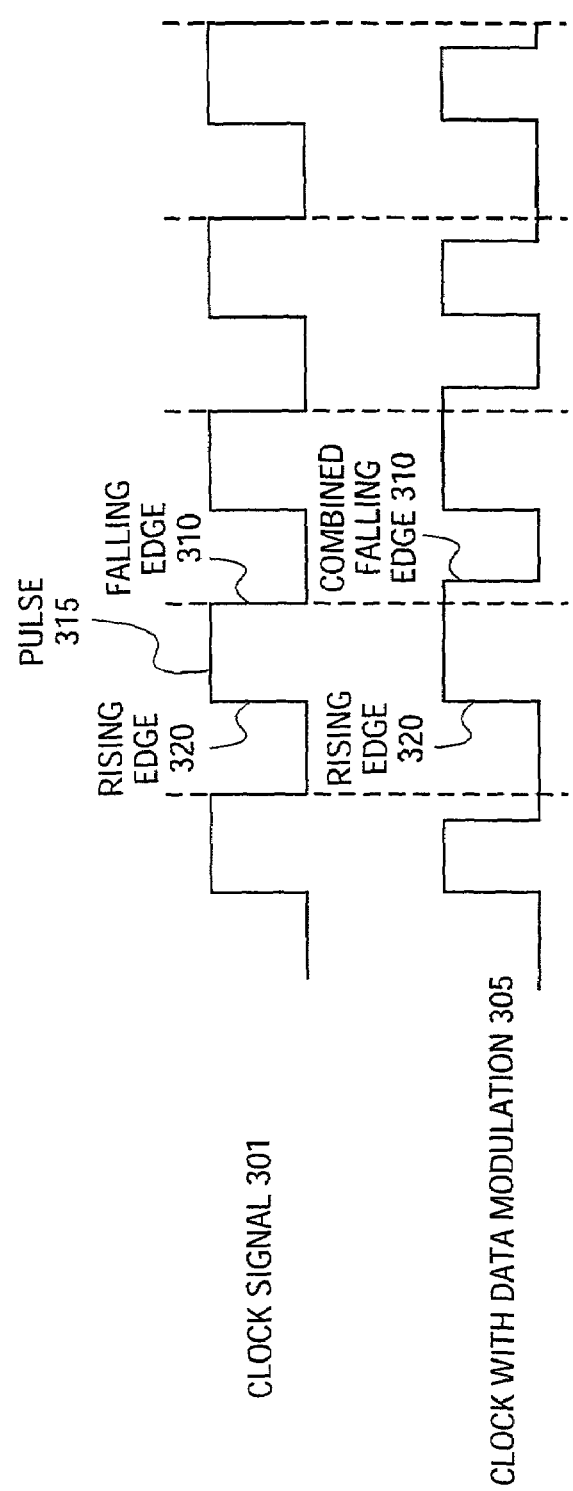
FIG. 3 illustrates a scheme for mixing a data signal into the clock signal in order to transmit the data and clock signals over the clock channel.

Multiplexing a data signal with the clock signal may be performed using a modulation method to modulate one signal onto another signal. For example, as shown in FIGS. 3 and 5, the location of the falling (or trailing) edge 310 of a pulse 315 of the clock signal 301 is modulated, or moved, with respect to the position of the rising edge 320 so that the falling edge 310 of combined clock and data signal 175 is a function of data signal 520, and the rising edge 320 of combined signal 175 is a function of clock signal 301. This combined clock and data signal 175 can then be used to transmit the data signal simultaneously with the clock signal. Alternatively, the position of the rising edge 320 is modulated, or moved, with respect to the falling edge 310 so that the position of the rising edge 320 of the combined clock and data signal 175 is a function of the data signal. Alternatively, both the rising and falling edges of the clock signal 301 are modulated, or moved, relative to their normal positions, so that the positions of both the rising and falling edges of the combined clock and data signal 175 is a function of the data signal. Note that the illustrated data signal 520 is the final component that modulates the clock signal 301. The original data signal, or the data words themselves, may typically be more simply represented. That is, the data signal 520 that is shown represents the data signal 520 after any encoding has been done to shift the energy spectrum of the data signal away from the energy spectrum of the clock signal 301.

The receiving end 160, as shown in FIG. 1, may recover the clock signal 301 from the combined signal 175 using a low pass filter, such as phase-locked loop (PLL) that can act as a low pass filter for example. The clock signal component of signal 175 may have a frequency that is well below the bandwidth of the clock transmission channel 170. Also, the data signal component of the combined signal may have a frequency that is significantly higher than the frequency of the clock signal component, and higher than the low pass filter loop bandwidth. At the receiving end 160, the combined signal passes through the low pass filter. The high frequency energy of the data signal is attenuated from the combined signal by the low pass filter. Therefore, the low pass filter can remove the data signal from the combined signal, and output a recovered clock signal.

Figure 4:
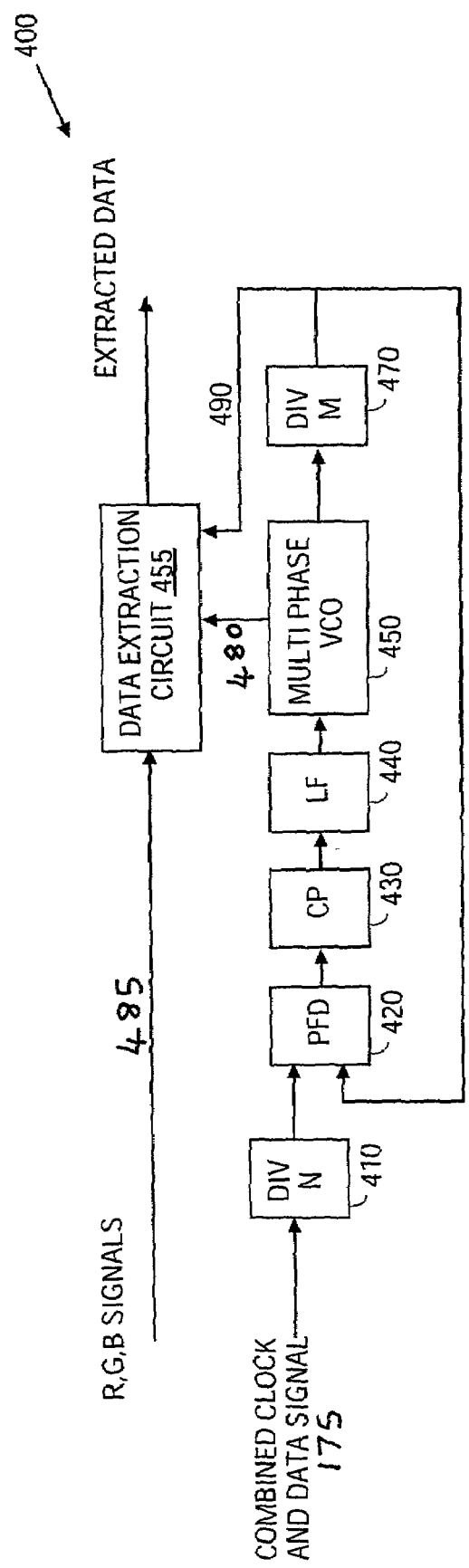
FIG. 4 is a block diagram of a portion of a receiver showing a phase locked loop (PLL) used to recover the clock signal from the combined clock and data signal.

An embodiment of a block diagram of a PLL low pass filter 400 used by the TMDS system 100 to recover the clock signal and send the recovered clock signal to data recovery components is shown in FIG. 4. Div N block 410 is a divide by N circuit that receives combined clock and data signal 175, divides signal 175 by N, and outputs a divided by N combined clock and data signal. PFD block 420 is a phase frequency detector that detects the frequency of divided by N combined signal. CP block 430 is a charge pump that increases the voltage level of the signal.

Loop filter (LF) block 440 follows block 430, and filters the signal in order to recover the data signal 480 and to recover the clock signal 490 from the combined signal 175. The multi-phase Voltage Controlled Oscillator (VCO) 450 feeds the recovered data signal 480 having a correctly generated frequency to the data extraction circuit 455. Data extraction circuit 455 is a dual-function circuit in the illustrated embodiment, and serves to extract the data both from recovered data signal 480 and from data signals 485 transmitted separately from the combined clock and data signal 175 over data channels 110, 120 and 130, as described above with reference to FIG. 1. Note that data extraction circuit 455 has been shown schematically as a dual function circuit for purposes of illustrating the invention only, and separate functionality is typically provided in two different modules, one for extracting data from the separate data channels and another for extracting data from the combined clock and data channel. This separate functionality usually results from the fact that the data extracting methods may be very different for the separate data channels as compared to the combined clock and data channel. Also, as will be appreciated by someone of ordinary skill in the art, a clock signal at the frequency of the original clock signal 301 is required to extract the data from the combined clock and data signal 175. This can be obtained by providing a separate output after the VCO block 450 block including a block that reverses the division conducted by the DIVN block 410. Alternatively, the data embedded in the combined clock and data signal 175 could be extracted directly by a separate data extraction circuit other than 455, which has an input of the combined clock and data signal 175.

VCO 450 also feeds the recovered clock signal to the divide by M (div M) block 470, where the recovered clock signal is divided by M. Div M block 470 then outputs the recovered clock signal 490 that is at the proper frequency, which is then provided to any device that needs it. For example, the proper frequency of signal 490 may be the frequency that is needed by data extraction unit 455 to extract data from the data signals 485 that are received by unit 455.

Thus, using modulation to combine the clock signal with the data signal allows the system 100 to transmit the combined signal 175 over clock channel 170. The modulation also allows the system 100 to recover the clock signal from the combined signal by using the low pass filter to attenuate the noise from the data signal component of the combined signal.

An example of the noise generated by combining the clock signal and the data signal is shown in FIG. 3. Modulating the clock signal 301 to include data signal 520 adds intentional jitter to the falling edge 310 of combined signal 175 in order to allow the transmission of both data and clock information over the same channel, or line. The combined signal 175, including the jitter in falling edges 310, is processed at the receiving end 160. At low frequencies, the jitter may only affect the unused, e.g., falling, edge of the combined signal.

The combined signal gives a minimal penalty in the performance of the system at low frequencies, because the PLL uses the rising edges of the incoming combined signal to compare clock phases. Therefore, a benefit of using modulation to combine signals is maintaining the orthogonal property of both the data signal and the clock signal. Also, because the clock signal is transmitted at a significantly lower frequency than the data signals, as shown in FIG. 2, the clock signal is not significantly attenuated in the bandwidth-limited clock channel 170.

However, as the frequency of the combined signal approaches the bandwidth limit of the clock channel, or the length of the clock channel cable increases, the combined signal is attenuated. This attenuation causes errors to the combined signal that is used to recover the clock signal. Therefore, the recovered clock signal that is output from the low pass filter also has errors caused by the attenuation.

Furthermore, at a higher clock frequency, the frequency of the clock signal approaches the frequency of the data signal. As a result, some of the energy components of the data signal are in a frequency region that is below the low pass filter's bandwidth, and are not attenuated by the low pass filter. The data signal's low frequency energy components that are able to pass through the low pass filter cause jitter noise to the combined signal. Therefore, the clock signal recovered by the low pass filter has jitter noise, which causes errors in the recovered clock signal that is output by the PLL. The jitter noise may be caused by inter-symbol interference and signal dispersion, for example.

Inter-symbol interference occurs when the frequency of the signal approaches the frequency of the clock channel bandwidth. At this high frequency, a bit, or symbol, transmitted on the signal is affected by an adjacent bit or symbol. This prevents the symbol from reaching the threshold needed for detection by the receiver.

Signal dispersion also occurs when the frequency of the signal is increased. For example, the digital data bits are represented on the signal as square waves. Each square wave has multiple frequency components. Some frequency components of a square wave travel faster than others, which cause the frequency components to become dispersed at high frequencies. The slower frequency components may affect subsequently transmitted bits, and the faster frequency components may affect previously transmitted bits. For example, the modulated falling edge of the clock signal may affect the rising edge of the clock signal because of this signal dispersion.

Therefore, the noise from inter-symbol interference and signal dispersion increases the amount of low frequency jitter noise that passes through the low pass filter, such as a PLL for example, along with the clock signal, and results in a noisy recovered clock signal. For example the effects of the noise caused by inter-symbol interference and signal dispersion at higher frequencies is shown with reference to FIGS. 5 and 6. The combined clock and data signal 175 may be represented as the superposition of clock signal 301 and data signal 520, as shown in FIG. 5.

When the combined signal is transmitted over the clock line at a frequency that approaches the limit of the clock channel's bandwidth, noise such as inter-symbol interference and signal dispersion cause the recovered clock and data signals to have errors. For example, FIG. 6 shows the recovered clock signal 610 and the recovered data signal 620 that both have errors produced by the noise that can pass through the low pass filter. Therefore, the recovered clock signal that is output from the PLL has an increased bit error rate (BER).

For example, the rising edge of the recovered clock signal is contaminated by $V_{error}$. The resulting error impact from the jitter noise can be expressed as:

$$t_{error} = \frac{V_{error}}{\frac{dV_{in}}{dt}}.$$

Because positive and negative pulses have opposite effects on the jitter, they effectively add jitter noise to the signal input to the PFD (Phase Frequency Detector) as shown in FIG. 4.

Figure 7:
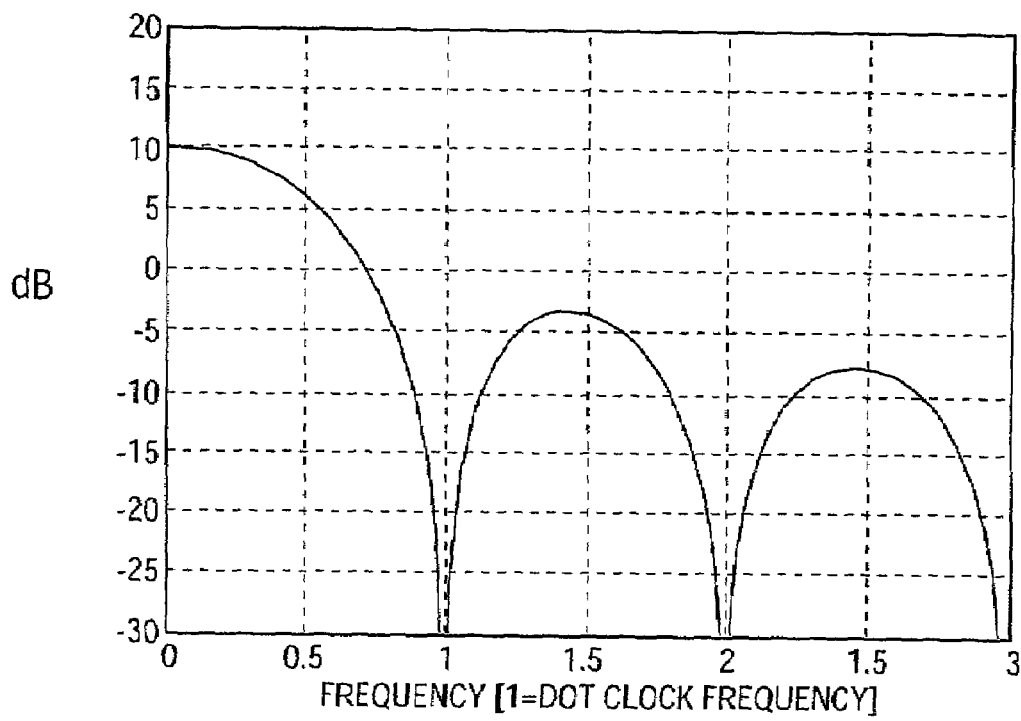
FIG. 7 shows a non-return-to-zero (NRZ) power spectrum of a data signal that is modulated with the clock signal and transmitted over the clock channel.

The amount of jitter noise in the low frequency region can be graphically shown by power and frequency spectrums. For example, a random data signal produces a power spectrum as illustrated in FIG. 7. This power spectrum is produced using the following equation:

$$\text{power} = k \frac{\sin^2\left(\frac{\pi f}{f_o}\right)}{\left(\frac{\pi f}{f_o}\right)^2},$$

where $f_o$ is the bit rate and f is the frequency.

Figure 8:
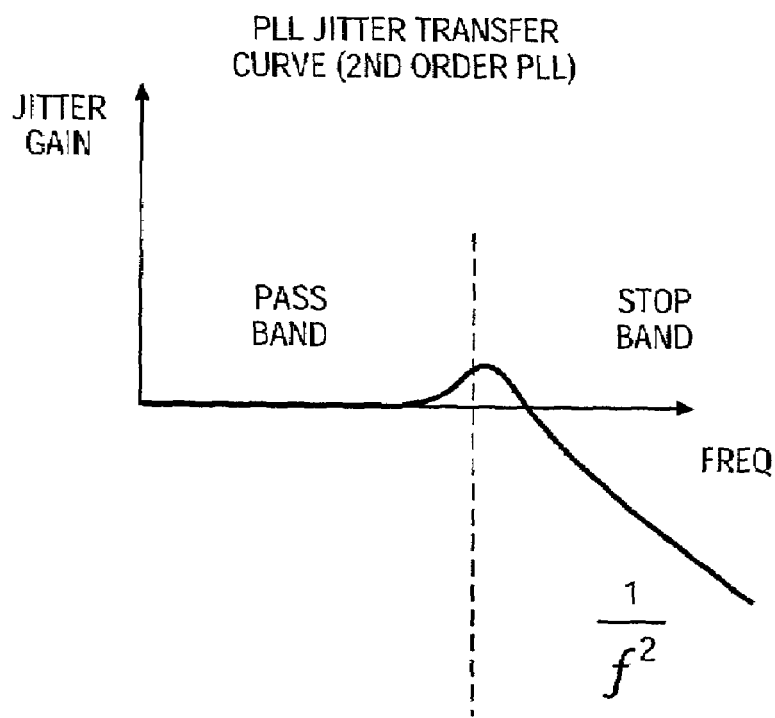
FIG. 8 shows PLL jitter transfer characteristics for a $2^{nd}$ order PLL used to recover the clock signal from the combined clock and data signal
Figure 9:
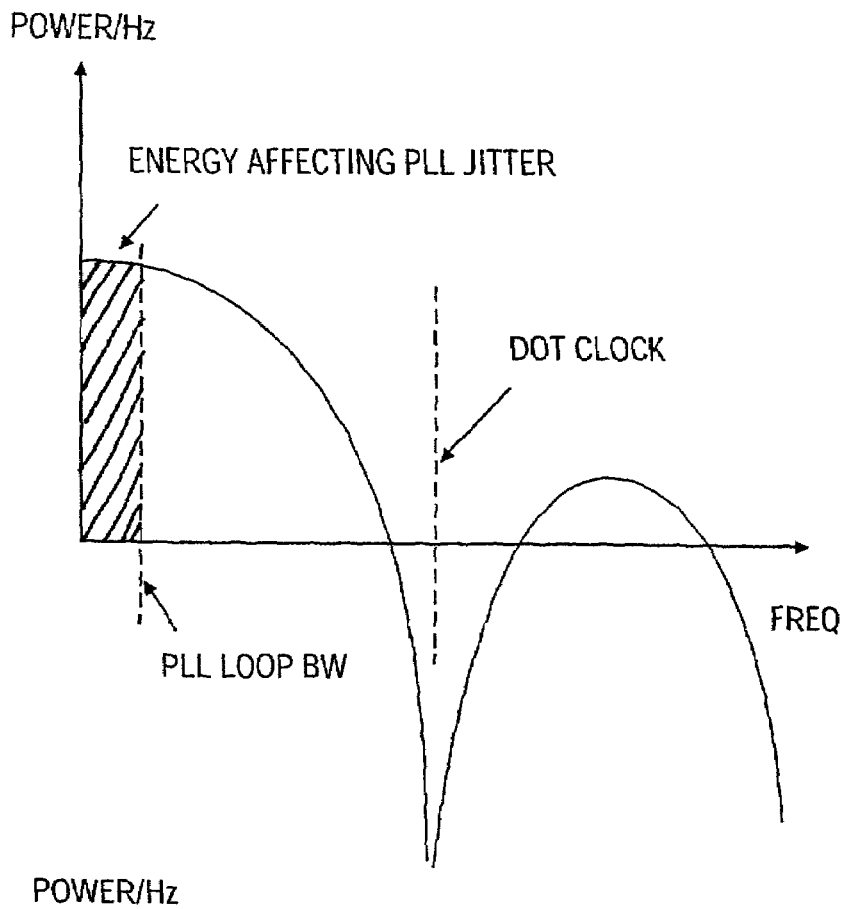
FIG. 9 shows the frequency spectrum of the combined clock and data signal after being transformed by the PLL jitter transfer characteristics.

With respect to the frequency spectrum, if a random data stream is input to a PLL having the transfer curve of FIG. 8, the noise energy components that are in frequency regions that are below the PLL loop bandwidth are able to pass through the low pass filter of the PLL, as shown in FIG. 9. Therefore, the PLL reshapes the incoming clock signal based on the unfiltered jitter noise power spectrum, and outputs a recovered clock signal having jitter noise components that are related to the PLL transfer characteristics.

Because the recovered clock signal that is output by the PLL includes the low frequency energy noise of the combined data and clock signal, as shown by the shaded regions of FIG. 9, this low frequency noise causes the recovered clock signal to have errors, which consequently causes errors in the data signals output by devices that use the clock signal for data recovery.

The amount of jitter noise that passes through the PLL, and is included in the recovered clock signal, can be significantly reduced or eliminated by encoding the data signal. The encoding can be used to reduce the amount of low frequency energy introduced onto the recovered clock signal from the jitter noise by moving a major portion of the data signal's data frequency spectrum into a higher frequency region that is above the PLL bandwidth. The PLL low pass filter attenuates the high frequency jitter noise from the combined clock and encoded data signal, and recovers the lower frequency clock signal with a reduced amount of noise.

Figure 10:
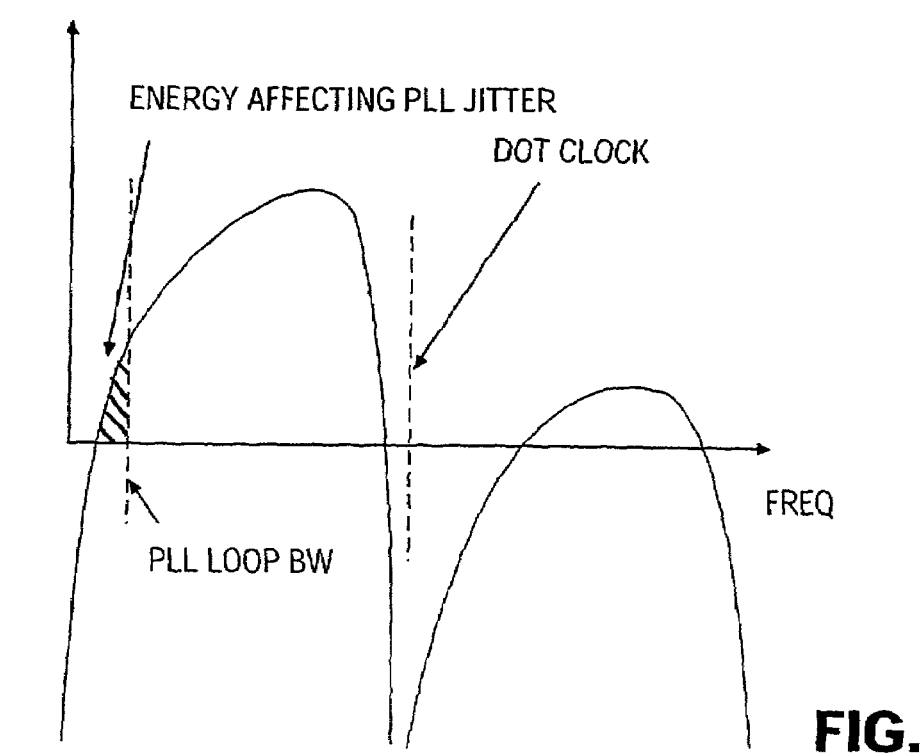
FIG. 10 shows the frequency spectrum jitter noise components in a combined encoded data and clock signal.

This movement of some jitter noise energy from lower frequency regions into higher frequency regions by encoding the data signal is apparent by comparing FIGS. 9 and 10. For example, the spectral energy distribution of a combined clock and unencoded data word is shown in FIG. 9. When a data signal is encoded, the encoding may include mapping an 8-bit data word onto a 10-bit data word for example. The mapping causes the combined clock and encoded data signal to have the spectral energy distribution as shown in FIG. 10.

A comparison of the differences between FIGS. 9 and 10 show that encoding a data word into a code space shifts the spectral energy distribution of the data word to higher frequencies, in order to move the energy of some low frequency jitter components of FIG. 9 into the higher frequencies of FIG. 10. For example, the amount of noise energy from the unencoded data signal that passes unfiltered through the PLL is shown by the energy distribution between the dotted lines of FIG. 9. This amount of noise energy is greater than the amount of noise energy from the encoded data signal that passes unfiltered through the PLL, which is shown in FIG. 10.

By shifting the energy spectrum of the combined clock and data signal away from the effective loop bandwidth of the PLL, the dependence on an unchanging front edge of the clock signal is substantially reduced or eliminated, permitting the front edge or both edges of the clock signal to be used for modulation.

The encoding causes the combined clock and encoded data signal to have characteristics that include minimizing or reducing jitter noise, such as inter-symbol interference and signal dispersion for example, in the combined signal that is transmitted over a band-limited channel. Because the PLL can filter the high frequency jitter component from the combined clock and encoded data signal, the encoding allows the PLL to attenuate the high frequency jitter noise energy from the combined signal as shown in FIG. 10.

As a result of encoding the data signal, therefore, the clock signal that is recovered by the PLL from the combined clock and encoded data signal has a reduced amount of noise energy, as shown by FIGS. 9 and 10. The recovered clock signal is sent to data recovery devices that use the clock signal to extract data either from a data signal or from the combined clock and encoded data signal. This extracted data has fewer errors because the recovered clock signal used by the data recovery devices has fewer errors, as compared to a clock signal recovered from a combined signal that includes an unencoded data signal.

One benefit of encoding the data is permitting a high frequency clock signal to be combined with encoded data to form a combined signal that is transmitted over a single channel, and permitting the clock signal and the encoded data signal of the transmitted combined signal to be recovered, because some low frequency components of the data signal are pushed to a higher frequency region by the data encoding. The high frequency may be a frequency that approaches the bandwidth of the clock channel, for example.

One method of data encoding uses minimal redundancy to increase the frequency spectrum of the energy introduced to the combined signal from modulating the data signal onto the clock signal, in order to reduce the amount of noise in the recovered clock signal. The minimal redundancy encoding method may include mapping the data signal by increasing the number of bits of data in the data signal before the data signal is mixed with the clock signal. Increasing the number of bits in the data signal allows most of the energy in the data signal to be placed in a frequency region that is high enough to be filtered by the PLL.

Figure 11:
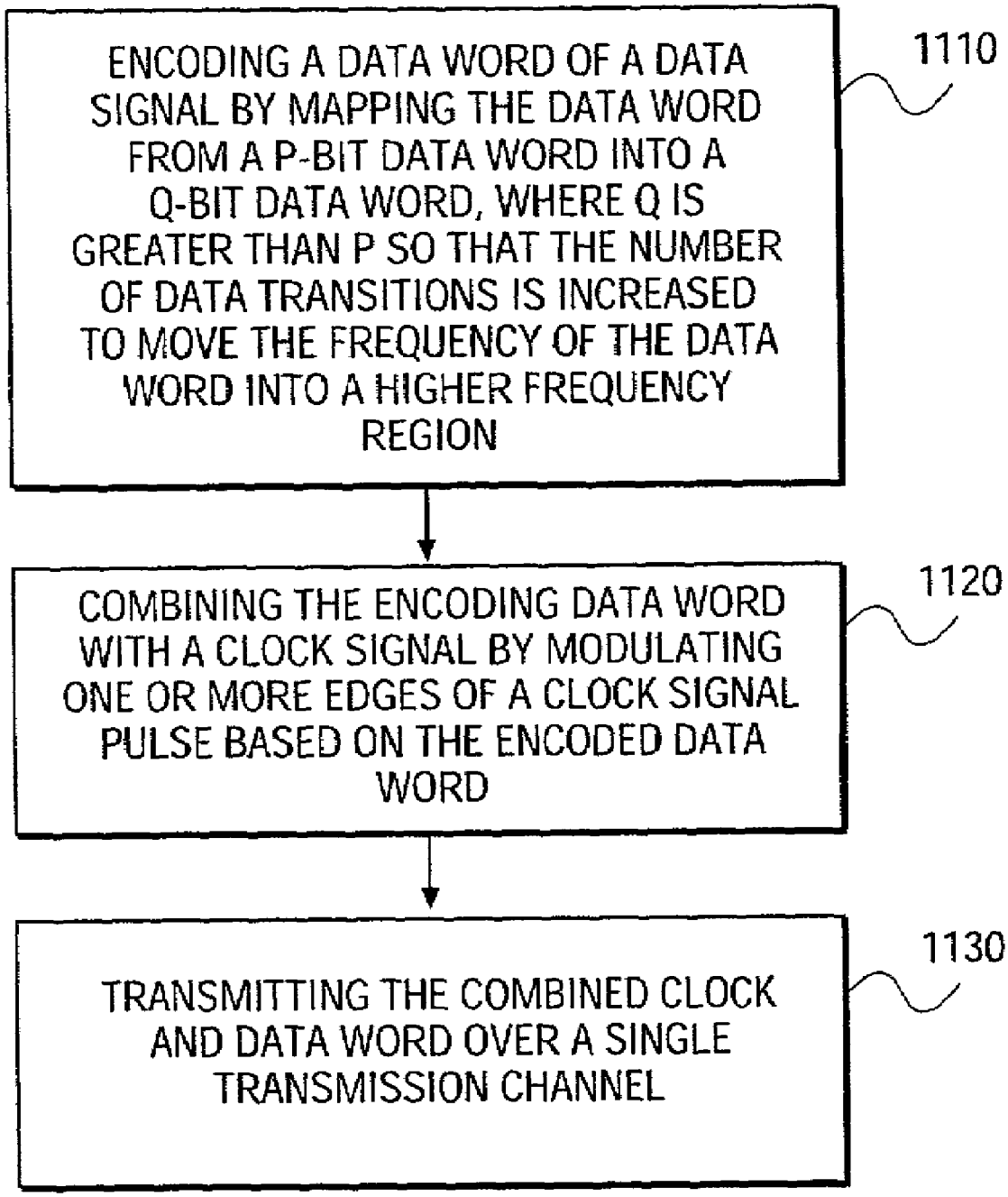
FIG. 11 shows an example of an encoding method.

The encoding increases, or maximizes, the data transitions, thus moving some or all of the noise energy into a higher frequency spectrum region. For example, an embodiment of encoding data is shown in FIG. 11. The encoding 1110 includes a data encoder in which an input data word having p-bits is mapped into a data word having q-bits, where q>p. Therefore, the encoding method increases the number of data transitions in order to move some energy from the jitter noise into higher frequency regions.

The method may combine the encoded data word with a clock signal by modulating one or more edges of a clock signal pulse based on the encoded data word, 1120. For example, modulating the data word onto a clock signal pulse may use a transition maximized encoding scheme to move a rising edge, a falling edge, or both edges of one or more pulses of the clock signal based on the encoded data word. Alternatively, an encoding scheme with less than full transition maximization may be used. In one embodiment, the clock modulation based on the encoded data signal includes pre-emphasis of the combined signal, so that the inter-symbol interference of the combined signal that is transmitted over a band-limited channel is minimized or reduced.

Also, the data may be encoded so that an output data word is a function of both the instantaneous input word and earlier input data words. For example, an output encoded data word may be a function of a finite number of future input data words or a finite number of earlier output data words or both. Furthermore, the encoding method may also include scrambling the encoded data signal in order to encrypt the data while maintaining the data signal's energy shift to higher frequencies. The encrypted data may be decrypted at the receiving end. The encoding method may use a coding that is direct current (DC) balanced to minimize DC component of encoded signal. The type of encoding that is used may vary depending on the frequency used and the amount of jitter reduction effect required by the devices that use the recovered clock signal, such as data recovery devices for example.

The combined clock and encoded data word is then transmitted over a single channel, 1130. In one embodiment, the data may be transmitted in both directions on the clock line. In another embodiment, the data may be transmitted in the opposite direction from the clock only.

Figure 12:
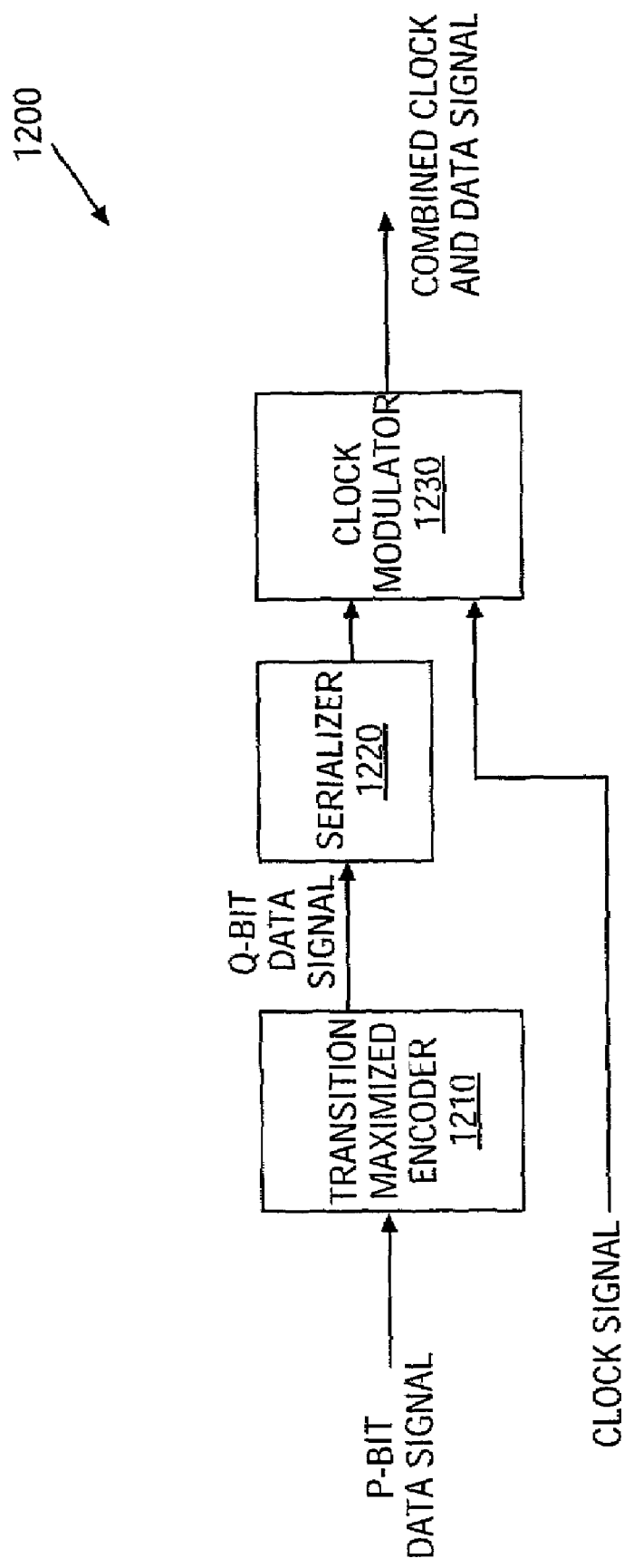
FIG. 12 shows a block diagram of an apparatus that generates a combined encoded data and clock signal.

An example of a device 1200 to encode a data signal and to combine the clock signal and the encoded data signal is shown in FIG. 12. Many different implementations of this device, which may be a transition-maximized (or transition increasing) encoder 1210, can be used. For example, one embodiment of the encoder 1210 maps an 8-bit input coding space into a 10-bit output coding space. This coding can be extended to map a p-bit into a q-bit by using higher redundancy. For example, instead of using an 8-bit to 10-bit encoding, the encoder may use an 8-bit to 12-bit encoding in order to further remove lower frequency components in the input stream.

If the encoded data signal needs to be serialized, serializer 1220 may be used to serialize the encoded data signal. After the data signal is encoded and serialized, the encoded data signal is combined with the clock signal. The combining may be performed by modulator 1230, which modulates the clock signal based on the encoded data signal to generate a combined clock and encoded data signal.

For example, in one embodiment the modulator may use one or more edges of a first edge, such as a rising or a falling edge for example, of one or more pulses of the clock signal to send precise reference clock information. In this embodiment, the modulator may use one or more edges of a second edge, such as a falling or a rising edge for example, of one or more pulses of the clock signal to send digital data information. Other embodiments of modulation may also be used. For example, both the rising edges and falling edges of the clock signal pulses may be modulated as a function of the encoded data signal, because the impact caused by jitter is greatly reduced by the frequency spectrum characteristics of the combined clock and encoded data signal. The combined signal may be transmitted in one signal cable.

A system and a method to combine a data signal with a clock signal have been discussed. Encoding a data signal before combining the data signal with a high frequency clock signal permits some of the noise components that are moved to higher frequencies by the encoding to be attenuated by the PLL. Because the high frequency noise components are attenuated, the amount of noise in the recovered clock signal is reduced. Therefore, removing some of the noise energy from the combined signal increases the precision in the recovered clock signal that is output by the PLL. This recovered clock signal with a reduced amount of errors allows data recovery devices that use the clock signal to extract data, either from a data signal, or from the combined clock and encoded data signal. This extracted data has fewer errors than data extracted by a data recovery device that uses a noisy clock signal recovered from a combined clock and unencoded data signal.

Thus, combining a clock signal and a data signal increases the bandwidth of the clock channel so that this channel can transmit both clock and data simultaneously. In one embodiment, the data signal may be encoded. Encoding the data signal moves some of the energy components of the data signal to move into higher frequency regions that can be filtered by the PLL, and reduces the amount of noise in the received combined encoded data and clock signal. Therefore, the combined encoded data and clock signal can be transmitted at a frequency that approaches the bandwidth of the clock channel without being significantly affected by noise, such as inter-symbol interference or signal dispersion, for example. Furthermore, the encoding permits the PLL to filter the high frequency energy from the combined signal, and to recover an accurate clock signal that can be used by other devices.

These and other embodiments of the present invention may be realized in accordance with the teachings described herein and it should be evident that various modifications and changes may be made in these teachings without departing from the broader spirit and scope of the invention. The specification and drawings are, accordingly, to be regarded in an illustrative rather than restrictive sense and the invention measured only in terms of the claims.

We claim:

1. A method of transmitting data in a system including at least one data channel and a separate clock channel, the clock channel being used to decode data transmitted on the at least one data channel, comprising:

combining a clock signal to be transmitted on the clock channel with a data signal having a plurality of data words to generate a combined clock and data signal, and transmitting the combined clock and data signal on the clock channel;

wherein the data signal has been generated from the data words using an encoding scheme that shifts an energy spectrum of the combined clock and data signal away from an effective loop bandwidth of a clock recovery block.

2. The method of claim 1 wherein the encoding scheme maps the data word from a p-bit data word into a q-bit data word, where q>p.

3. The method of claim 2 wherein said encoding scheme is direct current (DC) balanced to minimize a DC component of the combined signal.

4. The method of claim 2 wherein said encoding scheme further comprises: increasing a number of transitions in each data word.

5. The method of claim 1 wherein the clock signal has a plurality of pulses, each pulse of the plurality of pulses having a front edge and a back edge, and wherein the combining step comprises: modulating the data signal onto the clock signal by moving the front or back edges of the plurality of pulses.

6. The method of claim 1 wherein the clock signal has a plurality of pulses, each pulse of the plurality of pulses having a front edge and a back edge, and wherein the combining step comprises: modulating the data signal onto the clock signal by moving the front edges of the plurality of pulses.

7. The method of claim 1 wherein the clock signal has a plurality of pulses, each pulse of the plurality of pulses having a first edge and a second edge, and wherein the combining step comprises: modulating the data signal onto the clock signal by moving both the front edges and the back edges of the plurality of pulses.

8. The method of claim 1 wherein the encoding scheme is an encryption scheme.

9. A method of transmitting data in a system including at least one data channel and a separate clock channel, the clock channel being used to decode data transmitted on the at least one data channel, comprising:

combining a clock signal to be transmitted on the clock channel with a data signal having a plurality of data words to generate a combined clock and data signal, performing pre-emphasis to the combined signal, so that inter-symbol interference of the combined signal transmitted over a band-limited channel is minimized or reduced, and transmitting the combined clock and data signal on the clock channel;

wherein the data signal has been generated from the data words using an encoding scheme that shifts an energy spectrum of the combined clock and data signal away from an effective loop bandwidth of a clock recovery block.

10. A method of transmitting data in a system including at least one data channel and a separate clock channel, the clock channel being used to decode data transmitted on the at least one data channel, comprising:

combining a clock signal to be transmitted on the clock channel with a data signal having a plurality of data words to generate a combined clock and data signal, and transmitting the combined clock and data signal on the clock channel;

wherein the data signal has been generated from the data words using an encoding scheme that shifts an energy spectrum of the combined clock and data signal away from an effective loop bandwidth of a clock recovery block, wherein the encoding scheme includes the step of: encoding an instantaneous data word of said plurality of data words as function of both the instantaneous input word and earlier data words in the data signal.

11. A method of transmitting data in a system including at least one data channel and a separate clock channel, the clock channel being used to decode data transmitted on the at least one data channel, comprising:

combining a clock signal to be transmitted on the clock channel with a data signal having a plurality of data words to generate a combined clock and data signal, and transmitting the combined clock and data signal on the clock channel;

wherein the data signal has been generated from the data words using an encoding scheme that shifts an energy spectrum of the combined clock and data signal away from an effective loop bandwidth of a clock recovery block, wherein the encoding scheme includes the step of: encoding one of the data words of said plurality of data words as a function of one of the following: future data words; or earlier data words; or future and earlier data words; of said plurality of data words.

12. A method of transmitting data in a system including at least one data channel and a separate clock channel, the clock channel being used to decode data transmitted on the at least one data channel, comprising:

providing a clock signal having a plurality of pulses, each pulse of the plurality of pulses having a front edge and a back edge;

modulating a data signal having a plurality of data words onto the clock signal by moving at least one edge of the plurality of pulses, thereby to create a combined clock and data signal; and transmitting the combined clock and data signal on the clock channel.

13. The method of claim 12 further comprising: encoding the data words using an encoding scheme that maps the data words from p-bit data words into a q-bit data words, where q>p.

14. The method of claim 13 wherein the encoding scheme is direct current (DC) balanced to minimize a DC component of the combined signal.

15. The method of claim 12 wherein the modulating step comprises: modulating the data signal onto the clock signal by moving both of the front and back edges of the plurality of pulses.

16. The method of claim 12 wherein the modulating step comprises: modulating the data signal onto the clock signal by moving the front edges of the plurality of pulses.

17. The method of claim 12 wherein the modulating step comprises: modulating the data signal onto the clock signal by moving the back edges of the plurality of pulses.

18. The method of claim 12 further comprising: encoding the data words using an encoding scheme that increasing a number of transitions in each data word.

19. The method of claim 18 wherein the encoding scheme is an encryption scheme.

20. A method of transmitting data in a system including at least one data channel and a separate clock channel, the clock channel being used to decode data transmitted on the at least one data channel, comprising:

providing a clock signal having a plurality of pulses, each pulse of the plurality of pulses having a front edge and a back edge, modulating a data signal having a plurality of data words onto the clock signal by moving at least one edge of the plurality of pulses, thereby to create a combined clock and data signal, performing pre-emphasis to the combined signal, so that inter-symbol interference of the combined signal transmitted over a band-limited channel is minimized or reduced; and transmitting the combined clock and data signal on the clock channel.

21. A method of transmitting data in a system including at least one data channel and a separate clock channel, the clock channel being used to decode data transmitted on the at least one data channel, comprising:

providing a clock signal having a plurality of pulses, each pulse of the plurality of pulses having a front edge and a back edge, modulating a data signal having a plurality of data words onto the clock signal by moving at least one edge of the plurality of pulses, thereby to create a combined clock and data signal, encoding an instantaneous data word of said plurality of data words as function of both the instantaneous input word and earlier data words in the data signal; and transmitting the combined clock and data signal on the clock channel.

22. A method of transmitting data in a system including at least one data channel and a separate clock channel, the clock channel being used to decode data transmitted on the at least one data channel, comprising:

providing a clock signal having a plurality of pulses, each pulse of the plurality of pulses having a front edge and a back edge, modulating a data signal having a plurality of data words onto the clock signal by moving at least one edge of the plurality of pulses, thereby to create a combined clock and data signal, encoding one of the data words of said plurality of data words as a function of one of the following: future data words; or earlier data words; or future and earlier data words; of said plurality of data words; and transmitting the combined clock and data signal on the clock channel.

23. A system for transmitting data, comprising a transmitter including at least one data channel and a separate clock channel, the clock channel being used by a receiver to decode data transmitted on the at least one data channel, the transmitter being operative to:

combine a clock signal to be transmitted on the clock channel with a data signal having a plurality of data words, to generate a combined clock and data signal, and transmit the combined clock and data signal on the clock channel; wherein the data signal has been generated from the data words using an encoding scheme that shifts an energy spectrum of the combined clock and data signal away from an effective loop bandwidth of a clock recovery block.

24. The system of claim 23 wherein the encoding scheme maps the data word from a p-bit data word into a q-bit data word, where q>p.

25. The system of claim 23 wherein the clock signal has a plurality of pulses, each pulse of the plurality of pulses having a front edge and a back edge, and wherein the transmitter combines the clock signal with the data signal by: modulating the data signal onto the clock signal by moving at least one edge of the plurality of pulses.

26. The system of claim 23 wherein the clock signal has a plurality of pulses, each pulse of the plurality of pulses having a front edge and a back edge, and wherein the transmitter combines the clock signal with the data signal by: modulating the data signal onto the clock signal by moving the front edges of the plurality of pulses.

27. The system of claim 23 wherein the clock signal has a plurality of pulses, each pulse of the plurality of pulses having a first edge and a second edge, and wherein the transmitter combines the clock signal with the data signal by: modulating the data signal onto the clock signal by moving both the front edges and the back edges of the plurality of pulses.

28. A system for transmitting data, comprising
a transmitter including at least one data channel and a separate clock channel, the clock channel being used by a receiver to decode data transmitted on the at least one data channel, the transmitter being operative to:
provide a clock signal having a plurality of pulses, each pulse of the plurality of pulses having a front edge and a back edge;
modulate a data signal having a plurality of data words onto the clock signal by moving at least one edge of the plurality of pulses, thereby to create a combined clock and data signal; and
transmit the combined clock and data signal on the clock channel.

29. The system of claim 28 wherein the transmitter is further operative to: encode the data words using an encoding scheme that maps the data words from p-bit data words into a q-bit data words, where q>p.

30. The system of claim 28 wherein the transmitter is further operative to: modulate the data signal onto the clock signal by moving both of the front and back edges of the plurality of pulses.

31. The system of claim 28 wherein the transmitter is further operative to: modulate the data signal onto the clock signal by moving the front edges of the plurality of pulses.

32. The system of claim 28 wherein the transmitter is further operative to: modulating the data signal onto the clock signal by moving the back edges of the plurality of pulses.

33. The system of claim 28 wherein the transmitter uses an encoding scheme for generating the data signal from the data words that shifts an energy spectrum of the combined clock and data signal away from an effective loop bandwidth of a clock recovery block.

34. A method of transmitting data in a system including at least one data channel and a separate clock channel, the method comprising:
combining a clock signal to be transmitted on the clock channel with an encoded data signal having a plurality of encoded data words to generate a combined clock and encoded data signal;
the clock signal having a plurality of pulses and each pulse having a front edge and a back edge and a pulse width defined by the time difference of the front edge and back edge;
the combining further including encoding an unencoded data to generate an encoded data and modulating the encoded data onto the clock signal based on the encoded data by: (i) moving the front edge only of a particular pulse, (ii) moving the back edge only of a particular pulse, or (iii) moving both the front edge and the back edge of a particular pulse by different amounts or in different directions, wherein the movement in any of the cases causing a change in a change in the width of the particular pulse and the moving of at least one edge is effective to combine the encoded data signal onto the clock signal; and
transmitting the combined clock and encoded data signal on the clock channel;
wherein the encoded data signal is generated from the unencoded data words using an encoding scheme that shifts an energy spectrum of the combined clock and encoded data signal away from an effective loop bandwidth of a clock recovery block.

35. A method as in claim 34, wherein the modulating of the data signal onto the clock signal is performed after an encoding and a serialization of the data signal.

* * * * *